United States Patent [19]
Williams

[11] Patent Number: 5,346,317
[45] Date of Patent: Sep. 13, 1994

[54] HORIZONTAL BEARING ARRANGEMENT WITH CONTROLLED DRAG

[75] Inventor: Jack L. Williams, Orange, Calif.

[73] Assignee: ITT Corporation, New York, N.Y.

[21] Appl. No.: 104,959

[22] Filed: Aug. 9, 1993

[51] Int. Cl.⁵ ............................................. F16C 19/10
[52] U.S. Cl. .................................... 384/611; 384/609; 384/617
[58] Field of Search ........ 384/590, 609, 611, 615–618, 384/620–622

[56] References Cited

U.S. PATENT DOCUMENTS

| | | | |
|---|---|---|---|
| 2,690,364 | 9/1954 | Buckwalter | 384/617 |
| 2,726,834 | 12/1955 | Hoge | 384/615 X |
| 2,895,770 | 7/1959 | Matthews | 384/617 |
| 2,898,163 | 8/1959 | McMahan, Sr. | 384/611 |
| 3,008,778 | 11/1961 | Matthews | 384/609 |

FOREIGN PATENT DOCUMENTS 1034422  7/1958  Fed. Rep. of Germany ...... 384/609

Primary Examiner—Thomas R. Hannon
Attorney, Agent, or Firm—Menotti J. Lombardi

[57] ABSTRACT

A cage with bearing balls' confined therein is interposed between a plate and a planar platform, to accommodate rotation of the plate, and an electrically-powered device, such as a searchlight, can be fastened to the plate for rotation therewith. A disk, with a plurality of radially-extending fingers, is secured to the platform and is in biasingly restraint of the plate to (a) inhibit an unwarrantedly free rotation of the plate, i.e, to impose a controlled drag on the plate rotation, and (b) to enable the inverted operation of the overall combination.

12 Claims, 5 Drawing Sheets

HORIZONTAL BEARING ARRANGEMENT WITH CONTROLLED DRAG

BACKGROUND OF THE INVENTION

This invention pertains to horizontal bearings, and in particular to a novel horizontal bearing arrangement for (a) coupling thereto, and (b) rotatably supporting, an electrically-powered device such as a searchlight or the like.

In U.S. Pat. No. 4,930,057, issued on May 29, 1990, to Jack L. Williams, for a Searchlight Drive Means and Apparatus, there is disclosed a rotatable searchlight with a novel drive arrangement. The same advanced the art, however there has arisen a need for an arrangement, for such a searchlight, or other such device, which will facilitate a rotation thereof in an upstanding attitude, and in an inverted disposition. Such a need, then, warrants an innovative horizontal bearing arrangement to which the device, a searchlight, or other, can be coupled and be rotatably supported thereby in such upright, or inverted dispositions.

SUMMARY OF THE INVENTION

It is an object of this invention, then, to set forth a horizontal bearing arrangement, for (a) coupling thereto, and (b) rotatably supporting, an electrically-powered device, comprising a generally annular base: said base having a substantially planar platform; a plate surmounting said platform; a plurality of rolling elements, interposed between and rollingly engaged with said platform and said plate, for accommodating rotation of said plate relative to said platform; and means coupled to said base, and surmounting said plate, for restraining rotation of said plate.

DETAILED DESCRIPTION OF THE PREFERRED EMBODIMENT

Figure 1:
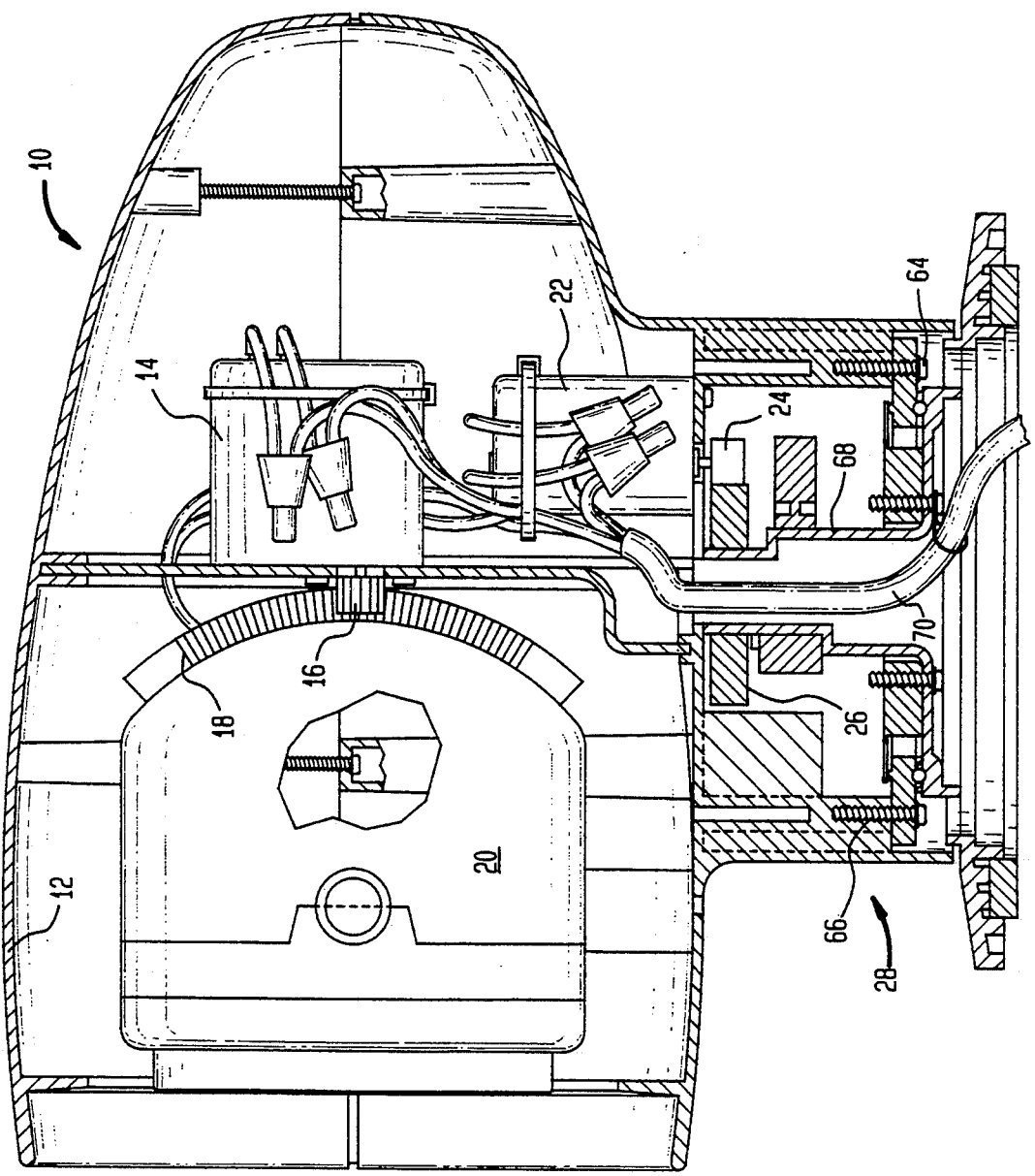
FIG. 1 is a vertical, cross-sectional view of a searchlight, electrically-powered, incorporating the novel horizontal bearing arrangement according to an embodiment of the invention.

As shown in FIG. 1, a searchlight 10 comprises a housing 12 which supports a lamp (not shown) therewithin. The housing 12 has a motor 14 for powering a pinion 16 which engages a curved, rack-type gear 18, the aforesaid being operative to rotate the lamp enclosure 20 upwardly and downwardly. Another motor 22 within the housing 12 drives a pinion 24; the latter engages a fixed gear 26 and, consequently, causes the housing 12 to rotate, horizontally, about gear 26.

For a fuller understanding of the nature and functioning of the searchlight 10 and its drive arrangement, the same can be found in the aforecited U.S. Pat. No. 4,930,057. To that end, Pat. No. 4,930,057 is incorporated herein by reference. In addition, pinion 24 and gear 26, by way of example, my comprise the structure set out in U.S. Pat. No. 5,000,721, issued on March 19, 1991, to Jack L. Williams, for a Clutch Apparatus. U.S. Pat. No. 5,000,721, then, is also incorporated herein by reference. While the instant invention concerns a horizontal bearing arrangement, for searchlight 10, or any other such device, the vertical and horizontal articulation of the searchlight 10 is not germane to the invention. Nonetheless, the cited patents offer a useful background to an appreciation of the novel bearing arrangement.

Figure 2:
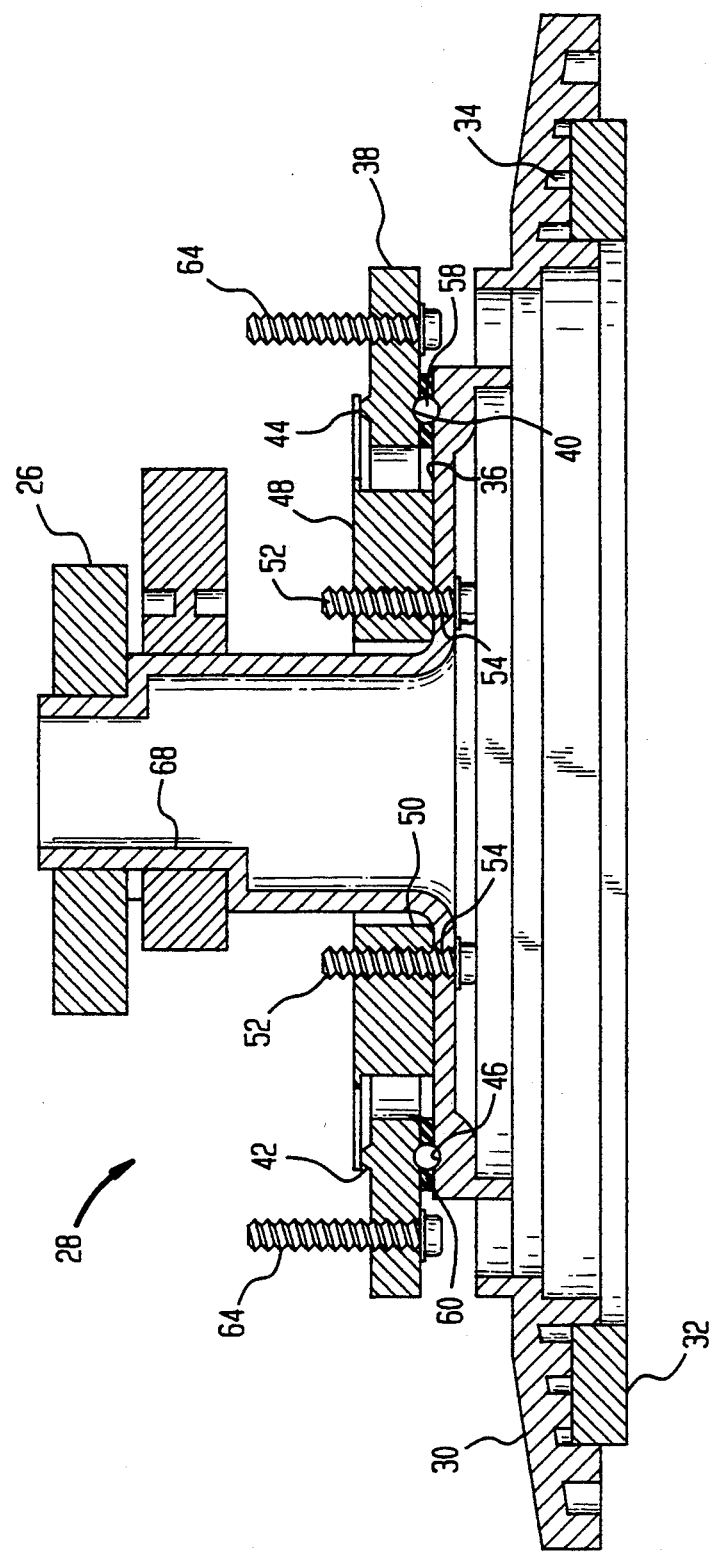
FIG. 2 is an enlarged, vertical, cross-sectional view of the inventive bearing arrangement of FIG. 1.
Figure 3:
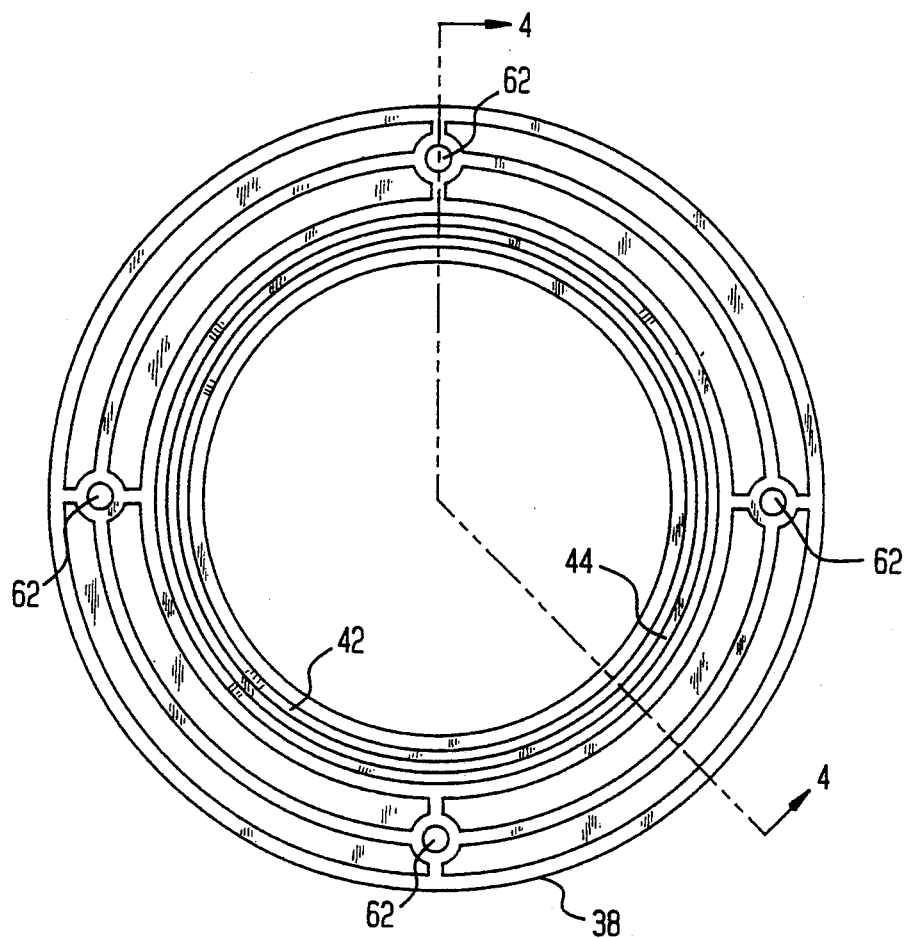
FIG. 3 is a plan view of the rotatable plate of the bearing arrangement.
Figure 4:
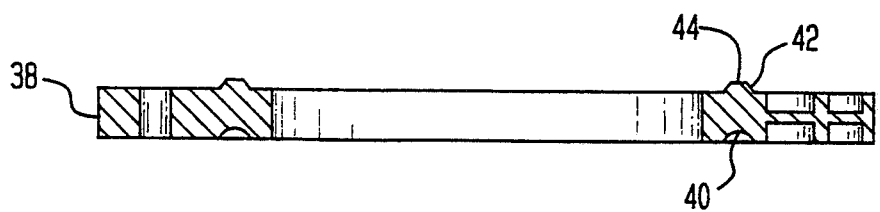
FIG. 4 is a cross-sectional view, taken along section 4—4 of FIG. 3.
Figure 6:
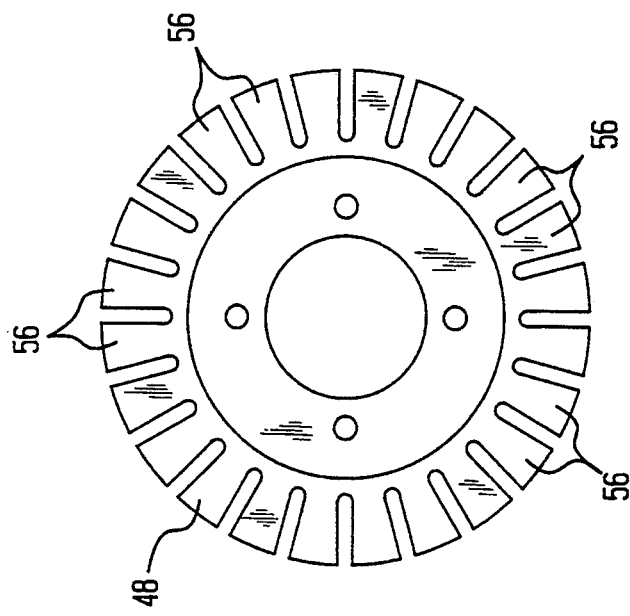
FIG. 6 is a between, plan view of the disk.
Figure 7:
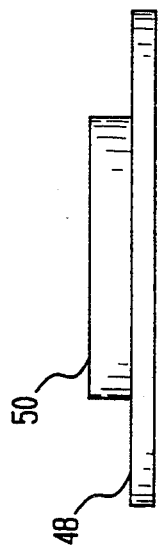
FIG. 7 is a side, elevational view of the disk.
Figure 5:
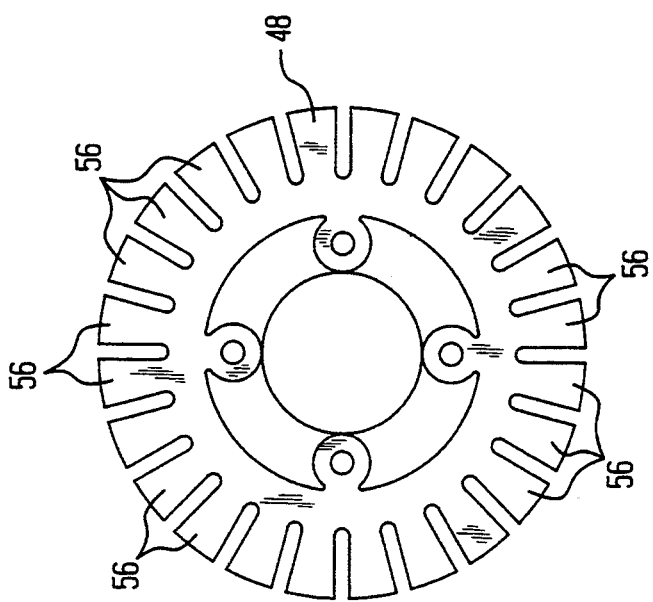
FIG. 5 is a top, plan view of the disk of the bearing arrangement.

The innovative, horizontal bearing arrangement 28 is shown in FIG. 1 with the housing 12 coupled thereto, and in FIG. 2, in greatly enlarged detail, without the searchlight housing 12. The arrangement 28 comprises an annular base 30 which receives a gasket 32 thereunder in a recess 34 provided therefor. The base 30 has a substantially planar platform 36. An annular plate 38 surmounts the platform 36, and has an annular trough 40 formed therein. Plan and cross-sectional views of the plate 38 are shown in FIGS. 3 and 4. The plate 38 further has an annular rib 42. The rib 42 is formed on the uppermost surface of the plate 38, and the trough 40 is formed in the undermost surface thereof; the rib and trough have a common diameter. The rib 42 terminates in a flat land 44. Platform 36 has an annular groove 46 formed therein which aligns with, and confronts the trough 40 of the plate 36. A disk 48, having an annular hub 50, shown in FIGS. 5–7, surmounts the plate 38 and platform 36. The hub 50 sets upon the platform 36, and has four, holes formed therein which receive fasteners 52 which penetrate bolt holes 54 formed therefor in the platform 36. Consequently, the disk 48 is held fast onto the platform, and against the plate 38. The disk 48 has a plurality of radially-extending fingers 56 which biasingly engage the plate to restrain rotation thereof, i.e., to put a desired drag on the rotation of the plate 38.

Figure 9:
FIG. 9 is a cross-sectional view of the cage of FIG. 8, taken along section 9—9 of FIG. 8.
Figure 8:
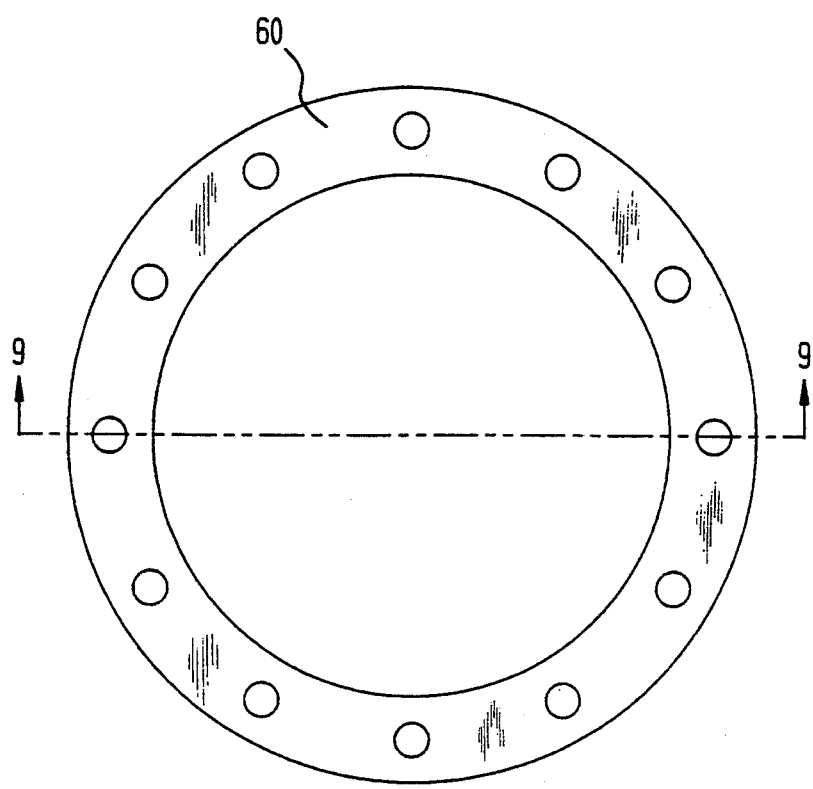
FIG. 8 is a plan view of the bearing ball cage.

Bearing balls 58, rollingly captive in a cage 60, the cage being shown in FIGS. 8 and 9, are interposed between the plate 38 and platform 36, in the cage 60. The balls 58 roll within the groove 46 and trough 40, to facilitate the rotation of the plate 38 relative to the platform 36. The plate 38 overhangs the platform 36, and adjacent the outer periphery thereof the plate has four bolt holes 62 for receiving bolts 64 which fasten into threaded recesses 66, in searchlight housing 12, for fastening the housing 12 thereto for rotation with the plate 38.

Without a due restraint, the plate 38 would be too freely rotatable. This is why the invention teaches the use of the disk 48 to impose the aforesaid drag on the plate 38 in its rotation. The fingers 56, which traverse the rib 42, and tightly engage the land 44, inhibit unwarrantedly free rotation of the plate 38. In addition, this innovation allows the device (here, a searchlight 10) to be wholly inverted. The fasteners 52 secure the disk 48 to the platform 36 and fast against the plate 38, and the plate 38 fixes the housing 12 thereto. Therefore, the whole assembly, the searchlight 10 and bearing arrangement 28, can be used in an upright disposition, completely inverted, or accommodated in a lateral, side-slung mounting, without any diminution of the functioning thereof. The novel bearing arrangement 28 satisfies the necessary radial and thrust functions for the combination, and provides superior lateral stability thereto.

The base 30 incorporates a hollow shaft 68, to which the gear 26 is secured, and the shaft serves the further purpose of confining therewithin the wiring harness or conduit 70 which supplies electrical power to the motors 14 and 22 and lamp.

While I have described the invention in connection with a specific embodiment thereof, it is to be clearly understood that this is done only by way of example, and not as a limitation to the scope of the invention, as set forth in the objects thereof and in the appended claims.

I claim:

1. A horizontal bearing arrangement, for (a) coupling thereto, and (b) rotatably supporting, an electrically-powered device, comprising:
   a generally annular base;
   said base having a substantially planar platform and annular groove formed thereon;
   a plate surmounting said platform, having an annular trough formed therein;
   said groove and trough are in mutually confronting alignment;
   a plurality of rolling elements, interposed between and rollingly engaged within said trough of said platform and said groove of said plate, for accommodating rotation of said plate relative to said platform; and
   restraining means coupled to said base, and surmounting said plate, for restraining rotation of said plate, and said restraining means comprising a disk with radially-extending limbs for biasingly engaging said plate and for imposing a controlled drag on the plate rotation.

2. A horizontal bearing arrangement, according to claim 1, wherein:
   said plate has an annular rib formed thereon; and
   said limbs engage and traverse said rib.

3. A horizontal bearing arrangement, according to claim 2, wherein:
   said trough and said rib have a common diameter.

4. A horizontal bearing arrangement, according to claim 2, wherein: said rib terminates in a flat land.

5. A horizontal bearing arrangement, according to claim 1, wherein:
   said plate overhangs said platform.

6. A horizontal bearing arrangement, according to claim 1, wherein:
   said base has a hollow shaft which extends centrally thereof.

7. A horizontal bearing arrangement, according to claim 1, further including:
   an annulus interposed between said platform and said plate;
   said annulus has a plurality of holes formed therein;
   said rolling elements are bearing balls; and
   said bearing balls are confined within said holes.

8. A horizontal bearing arrangement, according to claim 7, wherein:
   said annulus and said plate have a common inside diameter.

9. A horizontal bearing arrangement, according to claim 1, wherein:
   said disk further has a central, annular hub;
   said hub has a plurality of tapped holes formed therein;
   said platform has a plurality of apertures formed therein which align with said tapped holes; and further including
   fasteners in penetration of said apertures and secured in said tapped holes fastening said disk to said platform.

10. A horizontal bearing arrangement, according to claim 1, wherein:
    said plate has fastener holes formed therein for receiving fasteners for coupling of an electrically-powered device thereto.

11. A horizontal bearing arrangement, according to claim 1, wherein:
    said base has means extending therefrom for confining electrical conduit therewithin.

12. A horizontal bearing arrangement, according to claim 11, wherein:
    said conduit confining means comprises an upstanding, hollow shaft.

* * * * *